(12) United States Patent
Kim et al.

(10) Patent No.: US 9,736,859 B2
(45) Date of Patent: Aug. 15, 2017

(54) METHOD AND APPARATUS FOR PROVIDING VOICE SERVICE IN WIRELESS LOCAL AREA NETWORK

(71) Applicant: Samsung Electronics Co., Ltd., Suwon-si, Gyeonggi-do (KR)

(72) Inventors: Young-Jip Kim, Hwaseong-si (KR); Jung-Gi Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 129 days.

(21) Appl. No.: 14/091,820

(22) Filed: Nov. 27, 2013

(65) Prior Publication Data
US 2014/0146764 A1 May 29, 2014

(30) Foreign Application Priority Data
Nov. 28, 2012 (KR) .......................... 10-2012-0136557

(51) Int. Cl.
*H04W 74/00* (2009.01)
*H04W 84/12* (2009.01)

(52) U.S. Cl.
CPC .......... *H04W 74/006* (2013.01); *H04W 84/12* (2013.01)

(58) Field of Classification Search
None
See application file for complete search history.

(56) References Cited

U.S. PATENT DOCUMENTS

| 2006/0092963 | A1 | 5/2006 | Bakre et al. |
| 2006/0171314 | A1 | 8/2006 | Qian et al. |
| 2007/0165590 | A1* | 7/2007 | Kneckt et al. ................ 370/345 |
| 2007/0297368 | A1* | 12/2007 | Hori .................... H04L 41/5087 370/331 |
| 2008/0101308 | A1* | 5/2008 | Gaur ............................ 370/338 |
| 2008/0240049 | A1 | 10/2008 | Gaur |
| 2009/0257361 | A1 | 10/2009 | Deshpande et al. |
| 2010/0118830 | A1 | 5/2010 | Stephenson et al. |
| 2012/0026941 | A1 | 2/2012 | Ahmad et al. |
| 2012/0294142 | A1 | 11/2012 | Kneckt et al. |

FOREIGN PATENT DOCUMENTS

| KR | 10-2009-0078811 A | 7/2009 |
| WO | 2011-095669 A1 | 8/2011 |

OTHER PUBLICATIONS

Nasreddine Hajlaoui et al., A Frame Aggregation Scheduler for QoS-sensitive applications in IEEE 802.11n WLANs, Jun. 26, 2012.
The capability of the EDCA mechanism to support voice traffic in a mixed voice/data transmission over 802.11e WLANs—an experimental investigation, Oct. 1, 2007.

* cited by examiner

*Primary Examiner* — Michael Thier
*Assistant Examiner* — Kent Krueger
(74) *Attorney, Agent, or Firm* — Jefferson IP Law, LLP (57) ABSTRACT

A method for providing a voice service in a Wireless Local Area Network (WLAN) is provided. The method includes, detecting a change in the total number of voice calls that are sent and received over a wireless channel of the WLAN, setting channel access-related parameters in the WLAN upon detecting the change in the total number of voice calls, and providing a voice service by applying the channel access-related parameters to the voice and data services.

18 Claims, 7 Drawing Sheets

| | | Number of VoIP calls | | | | | | | | | |
|---|---|---|---|---|---|---|---|---|---|---|---|
| | | 2 | 4 | 6 | 8 | 10 | 12 | 14 | 16 | 18 | 20 |
| DISCLOSURE APPLIED | MOS | 4.24 | 4.16 | 4.22 | 4.19 | 4.14 | 4.18 | 4.07 | 4.19 | 4.21 | 4.18 |
| | TCP throughput (Mbps) | 32.49 | 31.16 | 27.13 | 25.25 | 23.06 | 17.65 | 15.87 | 7.48 | 4.30 | 4.07 |
| DISCLOSURE NOT APPLIED | MOS | 3.40 | 3.03 | 2.71 | 2.54 | 1.89 | 2.04 | 1.86 | 1.59 | 1.41 | 1.41 |
| | TCP throughput (Mbps) | 34.86 | 32.61 | 26.60 | 23.30 | 16.15 | 13.89 | 10.94 | 8.67 | 8.26 | 6.66 |

FIG. 8

METHOD AND APPARATUS FOR PROVIDING VOICE SERVICE IN WIRELESS LOCAL AREA NETWORK

CROSS-REFERENCE TO RELATED APPLICATION(S)

This application claims the benefit under 35 U.S.C. §119(a) of a Korean patent application filed on Nov. 28, 2012 in the Korean Intellectual Property Office and assigned Serial No. 10-2012-0136557, the entire disclosure of which is hereby incorporated by reference.

TECHNICAL FIELD

The present disclosure relates to a method and apparatus for providing a voice service in a Wireless Local Area Network (WLAN).

BACKGROUND

Due to the increase in the use of mobile devices such as smart phones, there has been an increase in the demand for voice and data services provided by enterprise Wireless Local Area Networks (WLANs).

In a related-art enterprise WLAN environment, a plurality of smart phones may access one Access Point (AP) and receive services from the AR In this environment, the AP should be able to service a plurality of voice calls, and provide voice and data services at the same time.

However, in the related-art WLAN, if the number of concurrent voice calls, requested to the AP, increases, and/or if the voice and data services need to be provided simultaneously, the quality of voice services may deteriorate, leading to the limited utilization of the related-art enterprise WLANs.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for dynamically changing channel access-related parameters according to a number of voice calls in a Wireless Local Area Network (WLAN), thereby providing voice services of improved Quality of Service (QoS).

In accordance with an aspect of the present disclosure, a method for providing a voice service in a WLAN is provided. The method includes, detecting a change in the total number of voice calls that are sent and received over a wireless channel of the WLAN, setting channel access-related parameters in the WLAN upon detecting the change in the total number of voice calls, and providing a voice service by applying the channel access-related parameters to the voice and data services.

In accordance with another aspect of the present disclosure, a method for receiving a voice service in a WLAN is provided. The method includes, receiving a beacon over a wireless channel of the WLAN, determining whether a change indicator indicates whether there is a change in channel access-related parameters in the WLAN, which are included in the beacon upon receiving the beacon over the wireless channel of the WLAN, obtaining the channel access-related parameters from the beacon, if the change indicator indicates the change in the channel access-related parameters, and receiving the voice service by applying the channel access-related parameters to the voice and data services.

In accordance with further another aspect of the present disclosure, an Access Point (AP) for providing a voice service in a WLAN is provided. The AP includes a transceiver configured to transmit and/or receive signals over a wireless channel of the WLAN and a controller configured to set channel access-related parameters in the WLAN upon detecting a change in the total number of voice calls that are sent and received over the wireless channel of the WLAN, and configured to control the transceiver to provide a voice service by applying the channel access-related parameters to the voice and data services.

In accordance with yet another aspect of the present disclosure, a terminal for receiving a voice service in a WLAN is provided. The terminal includes a transceiver configured to receive a beacon over a wireless channel of the WLAN and a controller configured to, upon receiving the beacon over the wireless channel of the WLAN, determine whether a change indicator indicates whether there is a change in channel access-related parameters in the WLAN, which are included in the beacon, configured to obtain the channel access-related parameters from the beacon if the change indicator indicates a change in the channel access-related parameters, and configured to control the transceiver to receive the voice service by applying the channel access-related parameters to the voice and data services.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In a Wireless Local Area Network (WLAN), an Access Point (AP) uses Carrier Sensing Multiple Access/Collision Avoidance (CSMA/CA) based on Medium Access Control (MAC) when the AP is connected to and communicates with a plurality of stations, for example, clients, mobile stations, mobile terminals, cell phones, portable electronic devices, Personal Computers (PCs), laptop PCs, terminals, or any other similar and/or suitable station that may be communicated with by the AR In order to ensure Quality of Service (QoS), the AP may use Enhanced Distributed Channel Access (EDCA) so that a frame of a higher priority class may be transmitted probabilistically earlier than a frame of a lower priority class. As to EDCA-based priority classes, a frame may be classified into a total of four different types depending on its service type (for example, Voice (VO), Video (VI), Best-Effort (BE) and Background (BK). In order to control priority class-specific transmission probability, EDCA may use EDCA parameters, which are set to different values for each priority class. The EDCA parameters may include an Arbitrary Inter-Frame Space Number (AIFSN), a Contention Window Minimum (CWmin), a Contention Window Maximum (CWmax), and a Transmit Opportunity (TXOP). Detailed definitions of the EDCA parameters will be given with reference to FIG. 3.

The WLAN may aggregate a plurality of MAC Protocol Data Units (MPDUs) into an Aggregated MPDU (AMPDU) transmission method to increase the transmission speed during data service. The AMPDU transmission method may generate an AMPDU by aggregating MPDUs and may transmit the AMPDU to increase the transmission efficiency in a physical layer. This AMPDU transmission method may be used to increase the throughput of Best Effort (BE) traffic having many MPDUs that can be aggregated, such as Transfer Control Protocol (TCP) traffic.

Figure 1:
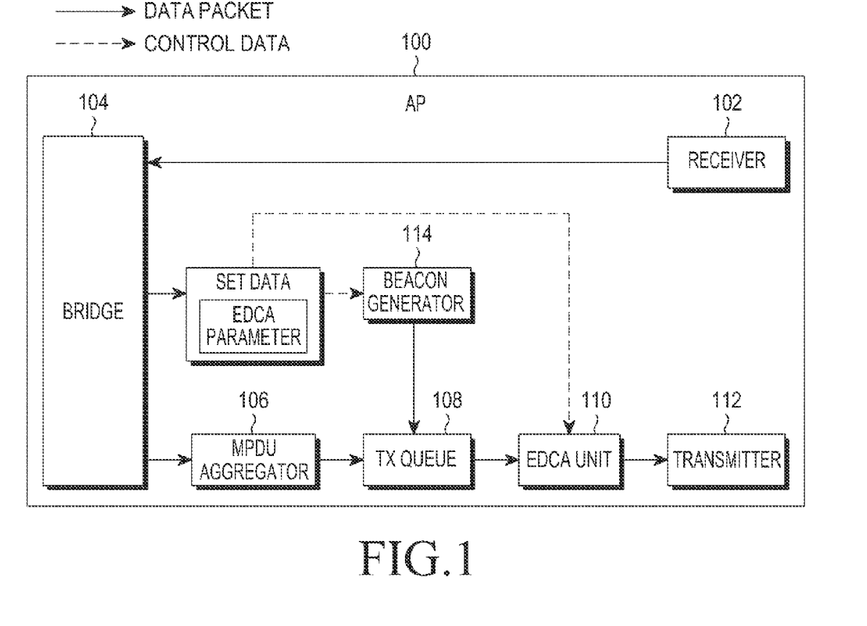
FIG. 1 illustrates a structure of an Access Point (AP) in a general Wireless Local Area Network (WLAN)

FIG. 1 illustrates a structure of an AP in a general WLAN.

Referring to FIG. 1, an AP 100 may include a receiver 102, a bridge 104, an MPDU aggregator 106, a transmission queue 108, an EDCA unit 110, a transmitter 112, and a beacon generator 114.

The receiver 102 receives a data packet from stations connected to the AP 100. The bridge 104 may play a role of connecting and/or provide a connection with the external network. The MPDU aggregator 106 may configure an AMPDU by aggregating data packets received through the bridge 104, and may store the AMPDU in the transmission queue 108. The EDCA unit 110 may identify a priority class of a frame, and may determine a time to transmit the frame over a wireless channel according to the identified priority class. Specifically, the EDCA unit 110 may set EDCA parameters used for controlling an EDCA operation separately for each priority class of each of frames stored in the transmission queue 108. The EDCA parameter values, which are set separately for each priority class, may be transferred to the beacon generator 114. Then, the beacon generator 114 may include and/or insert the received EDCA parameters in a beacon frame. Thereafter, the beacon frame may be broadcasted to the stations connected to the AP 100 through the transmitter 112. A station, which may also be referred to as a client, that has accessed the AP 100 and that has received the beacon frame from the AP, may reflect the EDCA parameter values obtained from the beacon frame in its EDCA operation. In this disclosure, the terms 'client' and 'station' will be used interchangeably. The EDCA unit 110 may determine a transmission time for a frame stored in the transmission queue 108 by applying the EDCA parameters, and may transfer the frame to the transmitter 112 at the determined transmission time. Thereafter, the transmitter 112 may transmit the frame over a wireless channel.

In addition, EDCA may use a binary exponential back-off method to avoid a transmission collision between an AP and stations, and to share wireless resources. The back-off method refers to a method of starting communication of data, after waiting for a predetermined time, according to an arbitrarily set back-off counter value, in an idle state in which there is no ongoing communication on a wireless channel.

Specifically, when transmitting a high-priority class frame, EDCA may set a relatively short back-off time for the frame. Thus, a high-priority class frame may be transmitted probabilistically earlier than a low-priority class frame. As a result, the following two problems may occur during voice services in the WLAN.

First, if a number of voice calls increases, then the possibility of a transmission collision between an AP performing communication in the WLAN and clients, which may also be referred to as 'WLAN devices', may increase, causing an increase in the probability of transmission failure. If there is a frame to transmit, then the WLAN device may attempt back-off, and may transmit the frame upon completion of the back-off Therefore, as the WLAN device sets a shorter back-off time, or as the number of WLAN devices simultaneously performing back-off is larger, multiple WLAN devices are likely to complete back-off at approximately the same time. In this case, since the WLAN devices, which have completed back-off, may transmit the frame at the same time, a transmission failure may occur due to the transmission collision between the transmitted frames. The possibility of transmission collision is high when the WLAN device transmits a frame for a voice service, which may also be referred to as a 'voice frame', having the highest priority class, because the WLAN device sets the shortest back-off time for the voice frame. In addition, upon transmission failure for the frame, the WLAN device may attempt more than one retransmission for the frame. Since the number of WLAN devices simultaneously performing back-off increases due to the retransmission, continuous transmission collision is likely to occur between WLAN devices. In this case, if the WLAN device continuously suffers a transmission failure a predetermined number of times or more, then the WLAN device may abandon transmission of the frame, causing a reduction in the quality of the voice service.

Next, in EDCA, since a voice frame has the highest priority as compared with other services, the voice frame may be transmitted earlier than frames having other priority classes. In comparison, a frame for a BE service, which may be referred to as a 'BE frame', may be relatively long in transmission time, since the BE frame is generally larger in size than the voice frame. Therefore, while a certain WLAN device transmits a BE frame, a WLAN device scheduled to transmit a voice frame may need to wait for the transmissions of frames having higher priorities.

Figure 2:
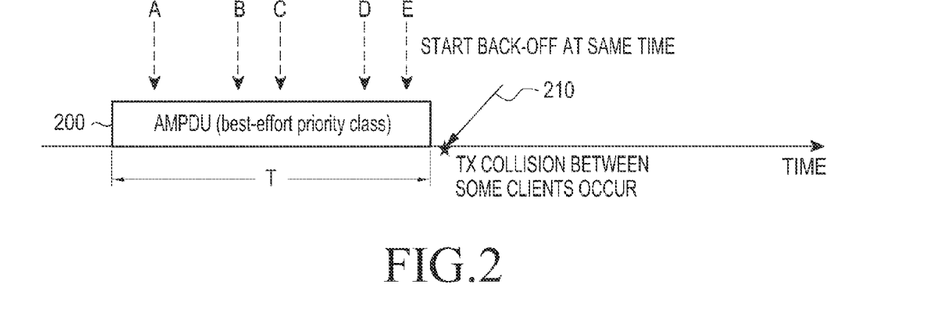
FIG. 2 illustrates how a quality of a voice call deteriorates when a voice call service is provided in WLAN communication.

FIG. 2 illustrates how a quality of a voice call deteriorates when a voice call service is provided in WLAN communication.

Referring to FIG. 2, it will be assumed that while an AP transmits an AMPDU 200, having a BE priority class, to any WLAN device, there are clients A, B, C, D and E that have a voice frame to transmit to the AR If the transmission of the AMPDU 200 is completed, then the clients A, B, C, D and E may wait to perform back-off without immediately transmitting the frame according to EDCA. Since the AMPDU 200 is a frame configured by aggregating many MPDUs, a transmission time T of the AMPDU is relatively long, causing an increase in the number of WLAN devices that are waiting to perform back-off Thereafter, if the transmission of the AMPDU 200 is completed, all the WLAN devices, for example, clients A, B, C, D and E, which are waiting to perform back-off, may start back-off at a same time 210, causing an increase in the possibility of a transmission collision. Particularly, in the case of a voice frame, since a back-off time of the voice frame is short, transmission collision between voice frames is highly likely to occur right after the transmission of the AMPDU 200 is completed, which is the main cause that the quality of voice services deteriorates when there is data traffic to transmit.

Therefore, in an embodiment of the present disclosure, the AP may collect information about the current channel status by monitoring traffic. Using the collected traffic monitoring information, the AP may determine whether the quality of the voice service deteriorates at the time a new voice call starts and/or at the time the existing voice call ends. The AP may reset at least one of channel access-related parameters according to the determination results, and may provide a voice service, to which the reset of the at least one channel access-related parameter is applied, thereby maintaining the QoS of voice calls. The AP may broadcast information about the reset of the at least one channel access-related parameter to the clients connected to the AP itself, and the clients which have received this information may also perform communication by applying the channel access-related parameters.

Figure 3:
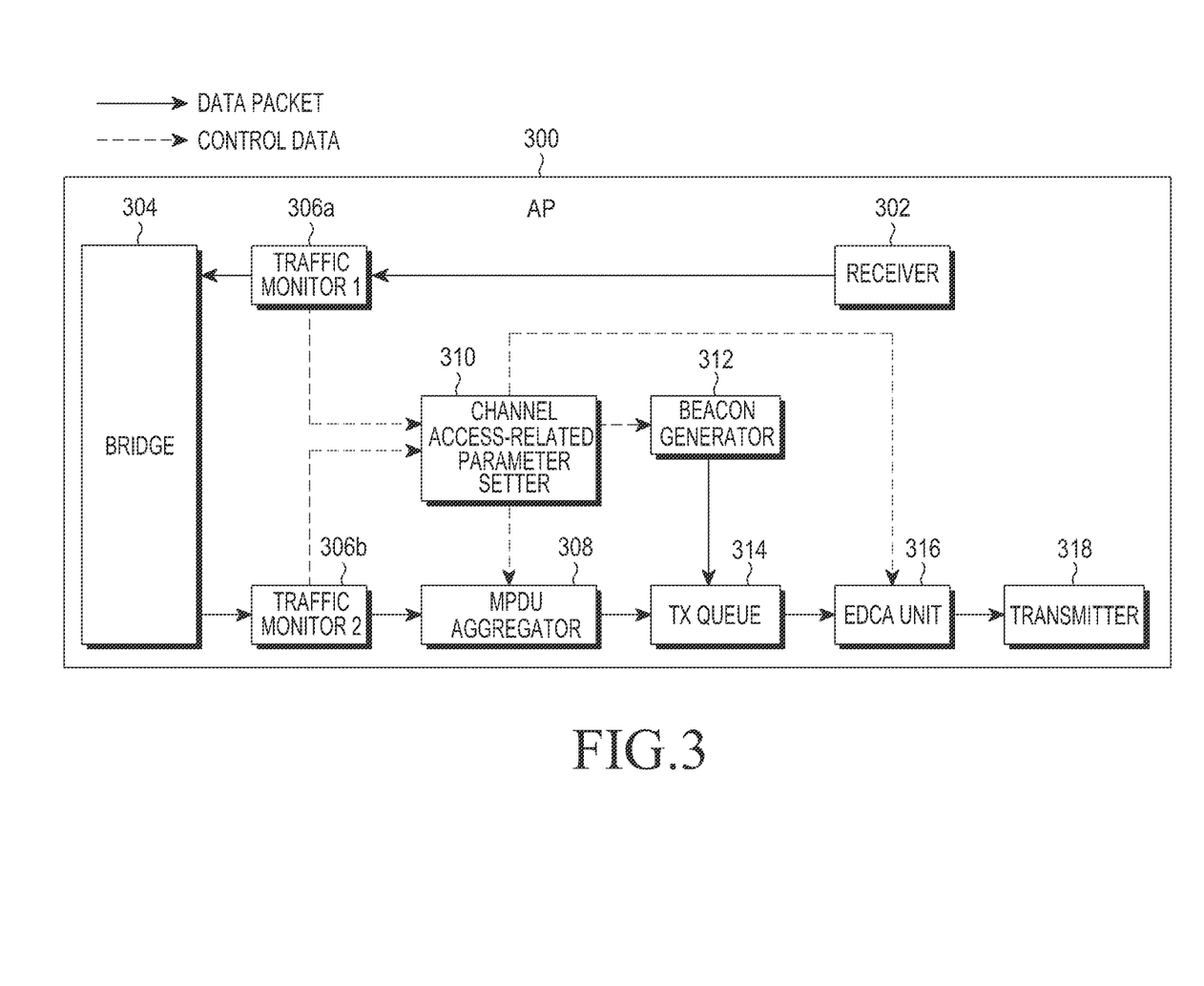
FIG. 3 illustrates a structure of an AP according to an embodiment of the present disclosure.

FIG. 3 illustrates a structure of an AP according to an embodiment of the present disclosure.

Referring to FIG. 3, an AP 300 may include a receiver 302, a bridge 304, traffic monitor #1 306a and traffic monitor #2 306b, an MPDU aggregator 308, a channel access-related parameter setter 310, a beacon generator 312, a transmission queue 314, which may also be referred to as a TX queue 314, an EDCA unit 316, and a transmitter 318. Although the structure of the AP 300 will be illustrated as an example in FIG. 3, the components of the AP 300 may be divided into sub-units, or may be incorporated into a single unit, and other similar and/or suitable elements not depicted in the AP 300 may be included in the AP 300.

The receiver 302 may receive data from clients connected to the AP 300, and the transmitter 318 may transmit data to the clients. The bridge 304 may play a role of connecting with the WLAN to which the AP 300 belongs, and connecting with an external network, for example, a Wide Area Network (WAN).

The traffic monitors #1 and #2 306a and 306b may monitor a channel status in order to generate monitoring information, and may deliver the monitoring information to the channel access-related parameter setter 310. For example, the traffic monitor #1 306a, which is connected to the receiver 302, may monitor a number of voice calls received from clients connected to the AP 300 in the WLAN, and may monitor wireless channel usage measured based on the amount of data traffic, and may transfer the monitoring information to the channel access-related parameter setter 310. The traffic monitor #2 306b, which is connected to the bridge 304, may also monitor the number of voice calls received from the external network, and may monitor wireless channel usage measured based on the about of data traffic, and may transfer the monitoring information to the channel access-related parameter setter 310.

Upon detecting a change in a total number of current voice calls, the channel access-related parameter setter 310 may determine the current channel status using the monitoring information. In accordance with an embodiment of the present disclosure, the total number of current voice calls may be changed if a new voice call starts, if the existing voice call ends, and/or if the existing voice call disappears due to a handover. The monitoring information may include the total number of voice calls received from clients connected to the AP 300 in the WLAN, the amount of data traffic, wireless channel usage monitored from the external network of the WLAN, and any other similar and/or suitable information that may be monitored by the traffic monitors #1 and #2 306a and 306b. The channel access-related parameter setter 310 may compare parameters, for example, the total number of voice calls, the amount of data traffic and the wireless channel usage, included in the monitoring information, with a threshold for the total number of voice calls, a threshold for the amount of data traffic, and a threshold for the wireless channel usage, respectively. If at least one parameter is greater than or equal to its threshold as a result of the comparison, then the channel access-related parameter setter 310 may determine the current channel status as a poor status, and the poor status may cause degradation of the QoS of a voice calls. On the other hand, if all the parameters are less than their thresholds, then the channel access-related parameter setter 310 may determine the current channel status as a good status, and in with the good status, the AP 300 may increase the throughput of BE traffic while maintaining the QoS of voice calls.

The channel access-related parameter setter 310 may reset at least one of MAC parameters according to the determined current channel status. Specifically, the channel access-related parameter setter 310 may reset each of the MAC parameters to be suitable for the current channel status according to the characteristics of each of the MAC parameters. The MAC parameters may include the above-described EDCA parameters, for example, aggregation limit, AIFSN, CWmin, CWmax and TXOP limit.

Specifically, the aggregation limit may be defined as a value for limiting the number of MPDUs that the MPDU aggregator 308 aggregates when generating an AMPDU. If a value of the aggregation limit increases, then the transmission time of the AMPDU may become longer as the number of aggregated MPDUs increases. In this case, while the quality of data service may increase in terms of the throughput, the quality of voice service may decrease in terms of the call quality. On the contrary, if a value of the aggregation limit decreases, then the number of aggregated MPDUs may decrease leading to a decrease in the transmission time of the AMPDU. Therefore, while the quality of voice service may increase in terms of the call quality, the quality of data service may decrease in terms of the throughput. Thus, if the current channel status is determined as a good status, then the channel access-related parameter setter 310 may increase the aggregation limit applied to the remaining priority classes, for example, Video, BE, and BK priority classes, except for the Voice priority class, taking into account the characteristics of the aggregation limit, thereby reducing the time it takes to transmit the same number of BE frames. In contrast, if the current channel status is determined as a poor status, then the channel access-related parameter setter 310 may decrease the aggregation limit.

The AIFSN is defined as the time it takes to determine an idle state of a channel for communication between the AP 300 and clients, and it may be set as a different time according to the priority class. As a value of the AIFSN is set smaller, the WLAN device may attempt back-off more frequently. Using the characteristics of the AIFSN, if the current channel status is determined as a good status, then the channel access-related parameter setter 310 may decrease a value of the AIFSN applied to the remaining priority classes, for example, Video, BE, and BK priority classes, except for the Voice priority class, thereby reducing the back-off waiting time. On the contrary, if the current channel status is determined as a poor status, then the channel access-related parameter setter 310 may increase a value of the AIFSN applied to the remaining priority classes, for example, Video, BE, and BK priority classes, except for the Voice priority class, thereby making it possible for a voice frame to be more frequently transmitted compared with frames having other priority classes.

The CWmin is defined as the minimum value of the back-off time window, and the CWmax is defined as the maximum value of the back-off time window. If the current channel status is determined as a poor status, then the channel access-related parameter setter 310 may increase CWmin and/or CWmax for each of all the priority classes to decrease the probability of transmission failure occurring between WLAN devices. On the contrary, if the current channel status is determined as a good status, then the channel access-related parameter setter 310 may decrease CWmin and/or CWmax for each of all the priority classes to reduce the time it takes to perform back-off by WLAN devices.

The TXOP limit is defined as a frame transmission time allocated to one WLAN device. Therefore, as the TXOP limit is set longer, the WLAN device may transmit more frames at a time. In this case, if the current channel status is determined as a poor status, then the channel access-related parameter setter 310 may decrease the TXOP limit for each of all the priority classes to decrease the probability of transmission collision between WLAN devices that transmit a voice frame right after the TXOP period. On the contrary, if the current channel status is determined as a good status, then the channel access-related parameter setter 310 may increase the TXOP limit for each of all the priority classes to decrease the number of back-off operations.

When increasing or decreasing the MAC parameters, the channel access-related parameter setter 310 may dynamically calculate optimal values for the MAC parameters according to the monitoring information. In an embodiment of the present disclosure, in addition to simply determining the current channel status as a poor status and/or a good status and in addition to dynamically calculating the MAC parameters, the channel access-related parameter setter 310 may set levels for each of the poor status and/or the good status, and control their associated MAC parameters based on a table in which decrement and increment ranges of aggregation limit, AIFSN, CWmin and/or CWmax and TXOP limit, which are applied in each level, are determined in advance. Thereafter, the channel access-related parameter setter 310 may transfer the MAC parameters, which are reset according to the current channel status, to at least one of the MPDU aggregator 308, the beacon generator 312 and the EDCA unit 316.

Figure 4:
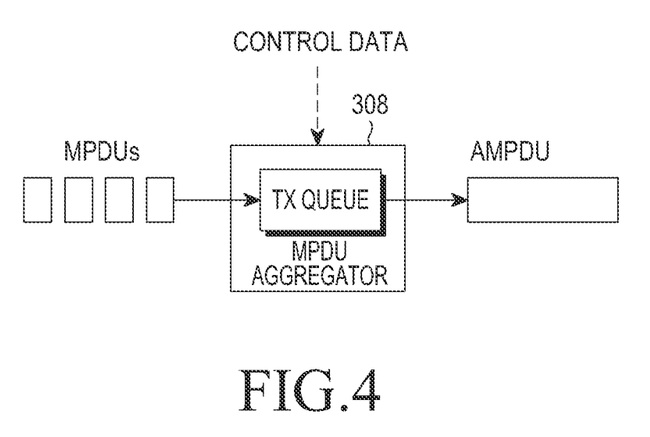
FIG. 4 illustrates a structure of an Media Access Control (MAC) Protocol Data Unit (MPDU) aggregator according to an embodiment of the present disclosure.

FIG. 4 illustrates a structure of an MPDU aggregator according to an embodiment of the present disclosure. For convenience of description, the structure of the MPDU aggregator will be described based on the AP structure in FIG. 3.

Referring to FIG. 4, the MPDU aggregator 308 may configure one AMPDU by aggregating MPDUs corresponding to a value of an aggregation limit, which is obtained from the channel access-related parameter setter 310 for a plurality of MPDUs received through the bridge 304, thereby preventing the time it takes to transmit the AMPDU in a physical layer from exceeding the value of the aggregation limit.

The beacon generator 312 may periodically generate a beacon frame of the AP 300, and may include and/or insert, in the beacon frame, EDCA parameters, except for the aggregation limit, from among the MAC parameters received from the channel access-related parameter setter 310. For example, the beacon frame, according to an embodiment of the present disclosure, may include EDCA parameters received from the channel access-related parameter setter 310 in a field storing an EDCA parameter set element, from among the fields including the existing information. The field may be defined as shown in Table 1 below.

TABLE 1

| | Element ID | Length (18) | QoS info | Reserved | AC_BE Parameter Record | AC_BK Parameter Record | AC_VI Parameter Record | AC_VO Parameter Record |
|---|---|---|---|---|---|---|---|---|
| Octets: | 1 | 1 | 1 | 1 | 4 | 4 | 4 | 4 |

Referring to Table 1, the EDCA parameter set element may include values of Element IDentifier (ID), Length, QoS info, and Reserved. In addition, the EDCA parameter set element may include a parameter record for a respective Access Category (AC), such as an AC_BE Parameter Record, an AC_BK Parameter Record, an AC_VI Parameter Record, and an AC_VO Parameter Record corresponding to BE, BK, VI and VO, respectively, depending on the EDCA-based priority classes. The first four bits of QoS Info may represent an EDCA parameter set update count that increases by one each time a value of an EDCA parameter is changed.

The transmission queue 314 may store the packets that the AP 300 will transmit. The EDCA unit 316 may output the packets stored in the transmission queue 314 to the transmitter 318 by applying the MAC parameters reset by the channel access-related parameter setter 310.

Figure 5:
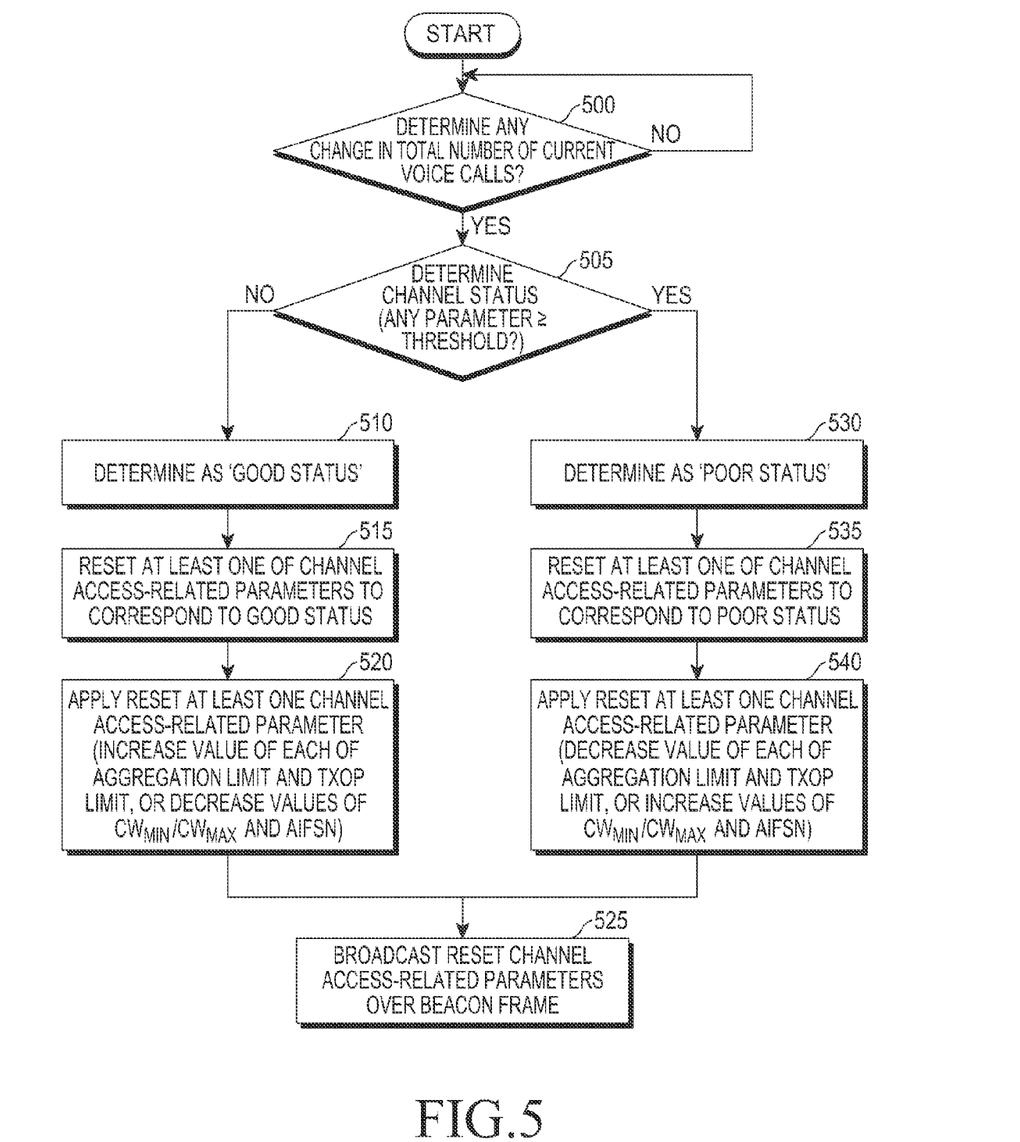
FIG. 5 is a flowchart illustrating an operation of an AP upon detecting a change in the total number of voice calls according to an embodiment of the present disclosure.

FIG. 5 is a flowchart illustrating an operation of an AP upon detecting a change in the total number of voice calls according to an embodiment of the present disclosure.

Referring to FIG. 5, the AP may detect a change in the total number of current voice calls in operation 500, and upon detecting the change in the total number of current voice calls, the AP may determine the current channel status using the collected monitoring information in operation 505. Upon failure to detect a change in the total number of current voice calls, the AP may continuously collect monitoring information. The change in the total number of current voice calls may occur if a new voice call starts, if the existing voice call ends, or if the existing voice call disappears due to handover.

Specifically, in operation 505, the AP may determine whether there is a parameter whose value is greater than or equal to the parameter's threshold, from among the parameters included in the monitoring information. If it is determined that there is no parameter whose value is greater than or equal to the parameter's threshold, then the AP may determine the current channel status as a good status in operation 510. The good status may be caused by, for example, the end of the ongoing voice call. In operation 515, the AP may reset at least one of the channel access-related parameters, which may be one of the MAC parameters, to correspond to the current channel status in order to improve the throughput while maintaining the QoS of the voice call. Specifically, the resetting of the MAC parameters may include increasing a value of each of the aggregation limit and the TXOP limit, or decreasing a value of each of the CWmin and/or CWmax and the AIFSN. In operation 520, the AP may apply the reset of the at least one MAC parameter to a frame transmission. In operation 525, the AP may broadcast the reset of the at least one MAC parameter to clients connected to the AP itself by including or inserting the reset of the at least one MAC parameter in a beacon frame. On the other hand, if it is determined, at operation 505, that there is a parameter whose value is greater than or equal to the parameter's threshold, then the AP may determine the current channel status as a poor status in operation 530. The poor status may be caused by, for example, the occurrence of a new voice call. In operation 535, the AP may reset at least one of the MAC parameters to correspond to the current channel status in order to ensure the QoS of the new voice call. Specifically, the resetting of the MAC parameters may include decreasing a value of each of the aggregation limit and the TXOP limit, and/or increasing a value of each of the CWmin and/or CWmax and the AIFSN. The resetting of the MAC parameters has been described in detail through the description of an operation of the channel access-related parameter setter 310 in FIG. 3 and operation 535 corresponds to operation 515, so a detailed description thereof will be omitted herein.

In operation 540, the AP may apply the reset of the at least one MAC parameter to a frame transmission. In operation 525, the AP may broadcast the reset of the at least one MAC parameter to clients connected to the AP itself by including or inserting the reset of the at least one MAC parameter in a beacon frame.

Thereafter, the clients, which have received the at least one MAC parameter, may apply the at least one MAC parameter, which is reset according to the current channel status, during the frame transmission to the AP.

Figure 6:
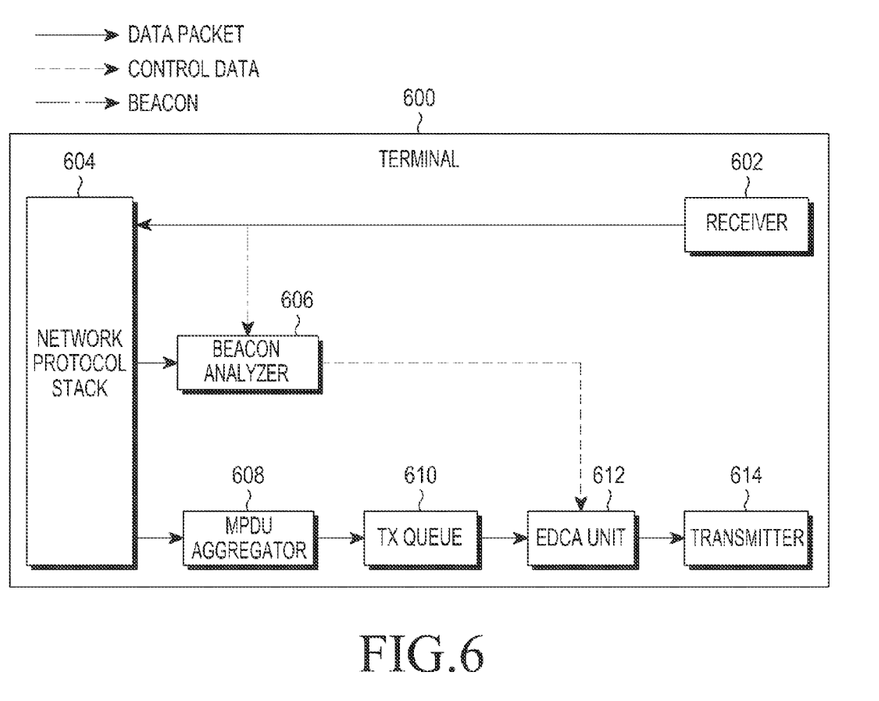
FIG. 6 illustrates a structure of a terminal according to an embodiment of the present disclosure.

FIG. 6 illustrates a structure of a terminal according to an embodiment of the present disclosure.

Referring to FIG. 6, a terminal 600 may include a receiver 602, a network protocol stack 604, a beacon analyzer 606, an MPDU aggregator 608, a transmission queue 610, an EDCA unit 612, and a transmitter 614. Similarly, although the structure of the terminal 600 will be illustrated as an example in FIG. 6, the components of the terminal 600 may be divided into sub-units, or may be incorporated into a single unit, and other similar and/or suitable components not shown as included in the terminal 600 may be included in the terminal 600.

The receiver 602 may receive a data packet and/or a beacon transmitted from the AP, and may transfer the received data packet to the network protocol stack 604 and/or beacon to the beacon analyzer 606. The network protocol stack 604 may play a role of forwarding the received data packet to an application, and may deliver a data packet generated by the application to the transmitter 614 through at least one of the MPDU aggregator 608, the transmission queue 610 and the EDCA unit 612.

The beacon analyzer 606 may analyze information included in the beacon received by the receiver 602, to control an operation of a WLAN device to correspond to the needs of the AP. In accordance with an embodiment of the present disclosure, the beacon analyzer 606 may extract EDCA parameter values in a field storing, for example, an EDCA parameter set element in the information contained in the beacon, and may provide the extracted EDCA parameter values to the EDCA unit 612.

The beacon analyzer 606 may determine an EDCA parameter set update count that is defined as the first four bits of QoS Info in the EDCA parameter element which is defined as shown in Table 1. If the EDCA parameter set update count is changed as a result of the determination, then the beacon analyzer 606 may determine that the AP has changed values of the EDCA parameters. In addition, the beacon analyzer 606 may make the EDCA unit 612 to reset values of the EDCA parameters according to a value of each of an AC_BE Parameter Record, an AC_BK Parameter Record, an AC_VI Parameter Record, and an AC_VO Parameter Record, which are specific to the EDCA-based priority classes, from the field of the beacon. For example, a structure of the priority class-specific parameter record may be defined as shown in Table 2 below.

TABLE 2

| | ACI / AIFSN | ECWmin / ECWmax | TXOP Limit |
|---|---|---|---|
| Octets: | 1 | 1 | 2 |

Referring to Table 2, each priority class-specific parameter record may include values of, for example, the ACI/AIFSN, the ECWmin/ECWmax and the TXOP Limit. The first four bits of the ACI/AIFSN may represent an AIFSN value. The first four bits of the ECWmin/ECWMax may represent the ECWmin, and may be based on the value of the ECWmin, and the CWmin may be calculated as "$2^{ECWmin}-1$". The remaining four bits of the ECWmin/ECWMax may represent the ECWmax, and may be based on the value of the ECWmax, and the CWmax may be calculated as "$2^{ECWmax}-1$". Finally, the TXOP Limit indicates a value of a TXOP limit in units of 32 μs.

Figure 7:
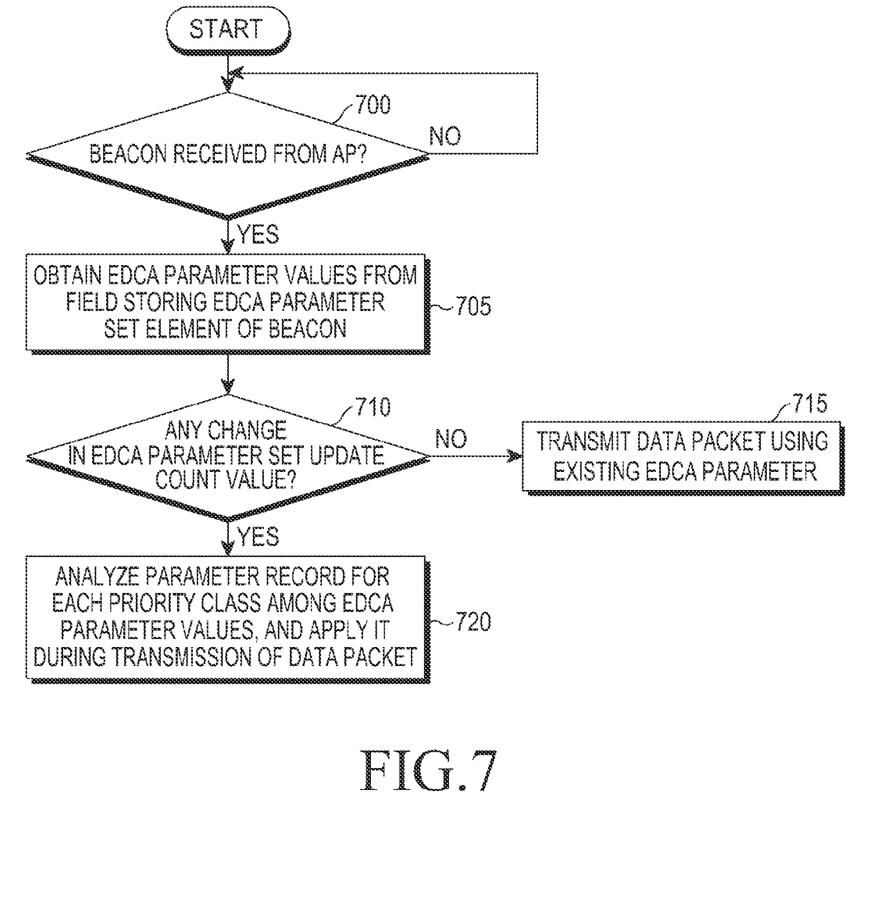
FIG. 7 is a flowchart illustrating an operation of a terminal according to an embodiment of the present disclosure.

FIG. 7 is a flowchart illustrating an operation of a terminal according to an embodiment of the present disclosure.

Referring to FIG. 7, the terminal may determine if a beacon has been received from an AP in operation 700, and, if the beacon has been received, then the terminal may proceed to operation 705. Otherwise, if no beacon is received, the terminal may continuously wait for reception of a beacon.

In operation 705, the terminal may obtain EDCA parameter values from a field storing an EDCA parameter set element of the received beacon. In operation 710, the terminal may determine whether there is a change in an EDCA parameter set update count value from among the obtained EDCA parameter values. If it is determined that the EDCA parameter set update count value is different from its previous value, then the terminal may analyze a parameter record separately for each priority class, from among the EDCA parameter values, and may apply the analyzed parameter record during transmission of data packets in operation 720.

On the contrary, if it is determined that the EDCA parameter set update count value is the same as its previous value, then the terminal may transmit data packets using the existing EDCA parameters in operation 715.

Figure 8:
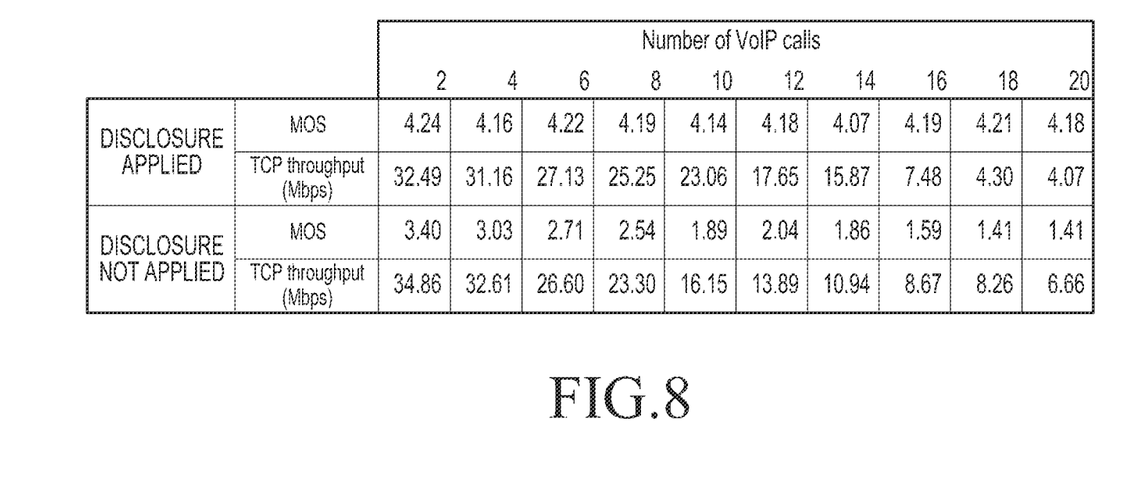
FIG. 8 is a table illustrating measurements of Quality of Service (QoS) and throughput of a voice call service according to an embodiment of the present disclosure.

FIG. 8 is a table illustrating measurements of QoS and throughput of a voice call service according to an embodiment of the present disclosure.

Referring to FIG. 8, it will be assumed that a total of 21 clients, which may also be referred to as smart phones, are connected to one AP. Under this assumption, the throughput was measured by applying Transmission Control Protocol (TCP) traffic to any one of the smart phones, and similarly, the QoS of a voice call for the smart phones was measured by sequentially applying a voice call to up to a total of 20 smart phones connected to the AP. Specifically, the QoS corresponds to the results obtained by measuring a Mean Opinion Score (MOS) corresponding to the number of voice calls when the number of voice calls increases from 2 to 20. Referring to the measurement results, in the case where the present disclosure is applied, the MOS of the voice calls is maintained at around 4.0, despite an increase in the number of voice calls. On the contrary, in the case where the present disclosure is not applied, the MOS decreases as the number of voice calls increases. In addition, it can be appreciated that there is no appreciable difference in TCP throughput between the case where the present disclosure is applied and the case where the present disclosure is not applied.

As is apparent form the foregoing description, the present disclosure may provide a method and apparatus for dynamically changing channel access-related parameters according to the number of voice calls in a WLAN, thereby increasing the data throughput while maintaining the QoS of voice calls.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for providing a voice service by an access point (AP) in a wireless local area network (WLAN), the method comprising:
    detecting a new voice call in the AP;
    if the new voice call is detected, determining a service quality of the voice service provided by the AP based on a number of voice calls, an amount of data traffic of the AP, and a wireless channel usage of the AP;
    if the service quality of the voice service corresponds to a first status, determining a first setting of channel access parameters for increasing a throughput of a data service while maintaining the service quality of the voice service;
    if the service quality of the voice service corresponds to a second status, determining a second setting of the channel access parameters for increasing the service quality of the voice service;
    transmitting information related to the channel access parameters; and
    transmitting frames for the voice service and the data service based on the first setting of the channel access parameters or the second setting of the channel access parameters.

2. The method of claim 1, wherein the information related to the channel access parameters comprises the first setting of the channel access parameters or the second setting of the channel access parameters, and a setting update counter of the channel access parameters.

3. The method of claim 1,
    wherein the channel access parameters comprise a limit value of a number of packets aggregated for remaining services except for the voice service, a frame transmission time allocated to the WLAN, a minimum/maximum value of a waiting time avoiding a transmission collision for each service provided from the AP, and a time interval provided to determine an idle state of a wireless channel, and
    wherein the remaining services comprises a video service, the data service, and a background service.

4. The method of claim 3,
    wherein the first setting comprises a value that increases a current value of the limit value and frame transmission times for the remaining services and the voice service by a predetermined first unit, and a value that decreases a current value of the time intervals for the remaining services and minimum/maximum values for the remaining services and the voice service by a predetermined second unit, and
    wherein the second setting comprises opposite values of the values included in the first setting.

5. The method of claim 1, wherein the determining the service quality of the voice service comprises:
    if the number of voice calls, the amount of data traffic, and the wireless channel usage are smaller than respective thresholds, determining the service quality of the voice service as the first status; and
    if at least one of the number of voice calls, the amount of data traffic, and the wireless channel usage is greater than or equal to the respective thresholds, determining the service quality of the voice service as the second status.

6. A method for receiving a voice service by a terminal in a wireless local area network (WLAN), the method comprising:
- receiving, from an access point (AP), information related to channel access parameters;
- determining whether a current setting of the channel access parameters is changed from an update counter included in the information related to the channel access parameters;
- if the current setting is changed, obtaining changed setting information of the channel access parameters included in the information, wherein the changed setting information is determined based on a service quality of the voice service provided by the AP; and
- transmitting frames for the voice service and a data service based on the changed setting information,
- wherein, if the service quality of the voice service corresponds to a first status, the changed setting information indicates a first setting for increasing a throughput of a data service while maintaining the service quality of the voice service, and
- wherein, if the service quality of the voice service corresponds to a second status, the changed setting information indicates a second setting for increasing the service quality of the voice service, and
- wherein the service quality of the voice service provided by the AP is determined based on a number of voice calls, an amount of data traffic of the AP, and a wireless channel usage of the AP.

7. The method of claim 6,
- wherein the channel access parameters comprise a limit value of the number of packets aggregated for remaining services except for the voice service, a frame transmission time allocated to the WLAN, a minimum/maximum value of a waiting time avoiding a transmission collision for each service provided from the AP, and a time interval provided to determine an idle state of a wireless channel, and
- wherein the remaining services comprises a video service, the data service, and a background service.

8. The method of claim 7,
- wherein the first setting comprises a value that increase a current value of the limit value and frame transmission times for the remaining services and the voice service by a predetermined first unit, and a value that decrease a current value of the time intervals for the remaining services and minimum/maximum values for the remaining services and the voice service by a predetermined second unit, and
- wherein the second setting comprises opposite values of the values included in the first setting.

9. The method of claim 6,
- wherein, if the number of voice calls, the amount of data traffic, and the wireless channel usage are smaller than respective thresholds, the service quality of the voice service provided by the AP is determined as the first status, and
- wherein, if at least one of the number of voice calls, the amount of data traffic, and the wireless channel usage is greater than or equal to the respective thresholds, the service quality of the voice service provided by the AP is determined as the second status.

10. An access point (AP) for providing a voice service in a wireless local area network (WLAN), the AP comprising:
- a processor configured to:
  - detect a new voice call in the AP, and
  - if the new voice call is detected,
    - determine a service quality of the voice service provided by the AP based on a number of voice calls, an amount of data traffic of the AP, and a wireless channel usage of the AP,
    - if the service quality of the voice service corresponds to a first status, determine a first setting of channel access parameters for increasing a throughput of a data service while maintaining the service quality of the voice service, and
    - if the service quality of the voice service corresponds to a second status, determine a second setting of the channel access parameters for increasing the service quality of the voice service; and
- a transceiver configured to:
  - transmit information related to the channel access parameters, and
  - transmit frames for the voice service and the data service based on the first setting of the channel access parameters or the second setting of the channel access parameters.

11. The AP of claim 10, wherein the information related to the channel access parameters comprises the first setting of the channel access parameters or the second setting of the channel access parameters, and a setting update counter of the channel access parameters.

12. The AP of claim 10,
- wherein the channel access parameters comprise a limit of the number of packets aggregated for remaining services except for the voice service, a frame transmission time allocated to the WLAN, a minimum/maximum value of a waiting time avoiding a transmission collision for each of services provided from the AP, and a time interval provided to determine an idle state of a wireless channel, and
- wherein the remaining services comprises a video service, the data service, and a background service.

13. The AP of claim 10,
- wherein the first setting comprises a value that increases a current value of the limit value and frame transmission times for the remaining services and the voice service by a predetermined first unit, and a value that decreases a current value of the time intervals for the remaining services and minimum/maximum values for the remaining services and the voice service by a predetermined second unit, and
- wherein the second setting comprises opposite values of the values included in the first setting.

14. The AP of claim 10,
- wherein, if the number of voice calls, the amount of data traffic, and the wireless channel usage are smaller than respective thresholds, determining the service quality of the voice service as the first status, and
- wherein, if at least one of the number of voice calls, the amount of data traffic, and the wireless channel usage is greater than or equal to the respective thresholds, determining the service quality of the voice service as the second status.

15. A terminal for receiving a voice service in a wireless local area network (WLAN), the terminal comprising:
- a transceiver configured to receive, from an access point (AP), information related to channel access parameters; and a processor configured to:
determine whether a current setting of the channel access parameters is changed from an update counter included in the information related to the channel access parameters,
if the current setting is changed, obtain changed setting information of the channel access parameters, wherein the changed setting information is determined based on a service quality of the voice service provided by the AP, and
control the transceiver to transmit frames for the voice service and a data service based on the changed setting information,
wherein if the service quality of the voice service corresponds to a first status, the changed setting information indicates first setting for increasing a throughput of a data service while maintaining the service quality of the voice service, and
wherein, if the service quality of the voice service corresponds to a second status, the changed setting information indicates second setting for increasing the service quality of the voice service, and
wherein the service quality of the voice service provided by the AP is determined based on a number of voice calls, an amount of data traffic of the AP, and a wireless channel usage of the AP.

16. The terminal of claim 15, wherein the channel access parameters comprise a limit of the number of packets aggregated for remaining services except for the voice service, a frame transmission time allocated to the WLAN, a minimum/maximum value of a waiting time avoiding a transmission collision for each of services provided from the AP, and a time interval provided to determine an idle state of the wireless channel, and
wherein the remaining services comprises a video service, the data service, and a background service.

17. The terminal of claim 16,
wherein the first setting comprises a value that increases a current value of the limit value and frame transmission times for the remaining services and the voice service by a predetermined first unit, and a value that decreases a current value of the time intervals for the remaining services and minimum/maximum values for the remaining services and the voice service by a predetermined second unit, and
wherein the second setting comprises opposite values of the values included in the first setting.

18. The terminal of claim 15,
wherein, if the number of voice calls, the amount of data traffic, and the wireless channel usage are smaller than respective thresholds, the service quality of the voice service provided by the AP is determined as the first status; and
wherein, if at least one of the number of voice calls, the amount of data traffic, and the wireless channel usage is greater than or equal to the respective thresholds, the service quality of the voice service provided by the AP is determined as the second status.

* * * * *